E. SCHNEIDER.
APPARATUS FOR VARYING THE RECOIL OF GUNS.
APPLICATION FILED JUNE 16, 1919.

1,335,463.

Patented Mar. 30, 1920.
14 SHEETS—SHEET 10.

Inventor:-
Eugene Schneider
By Mauro, Cameron, Lewis & Massie
Attorneys

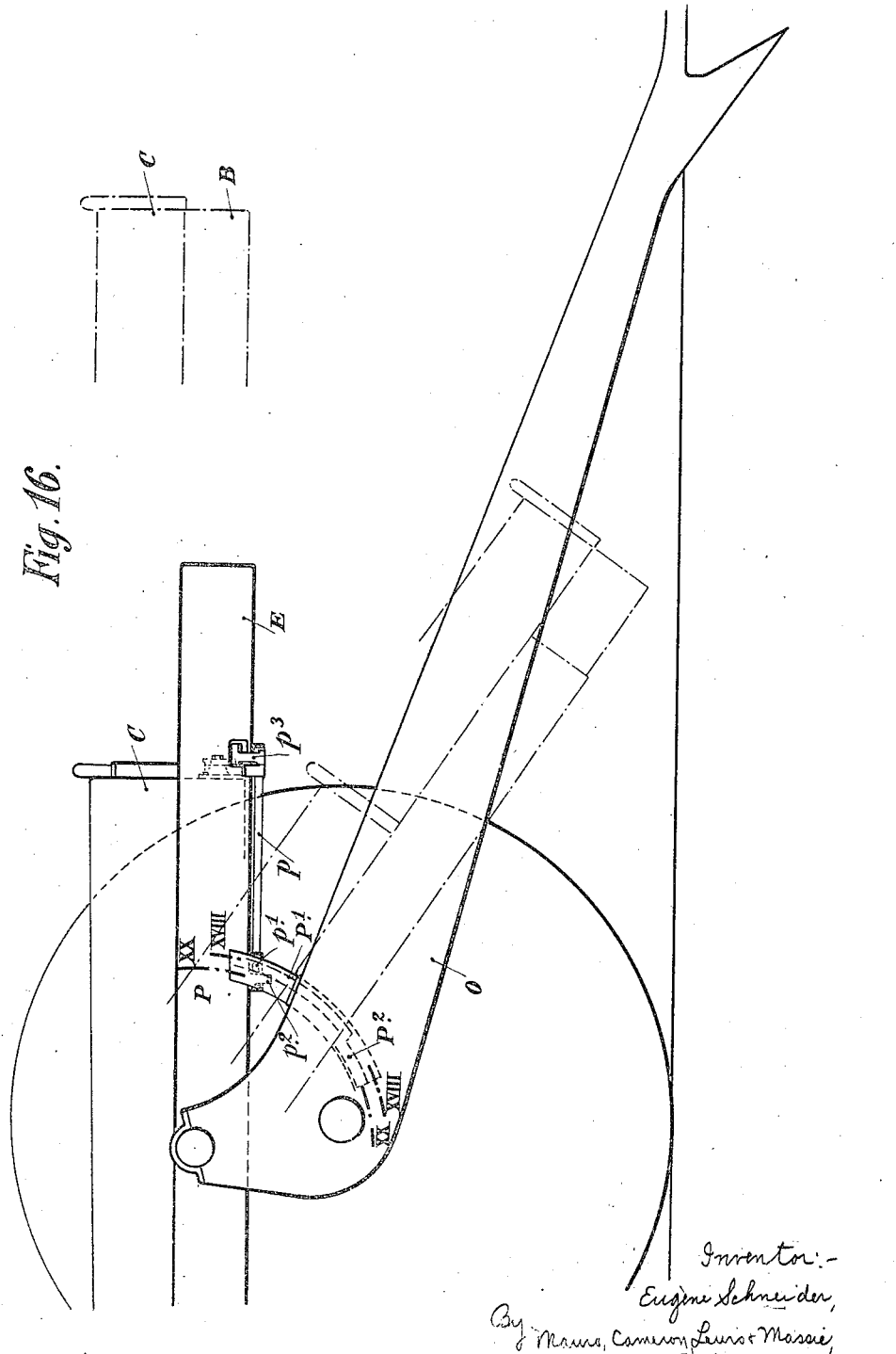

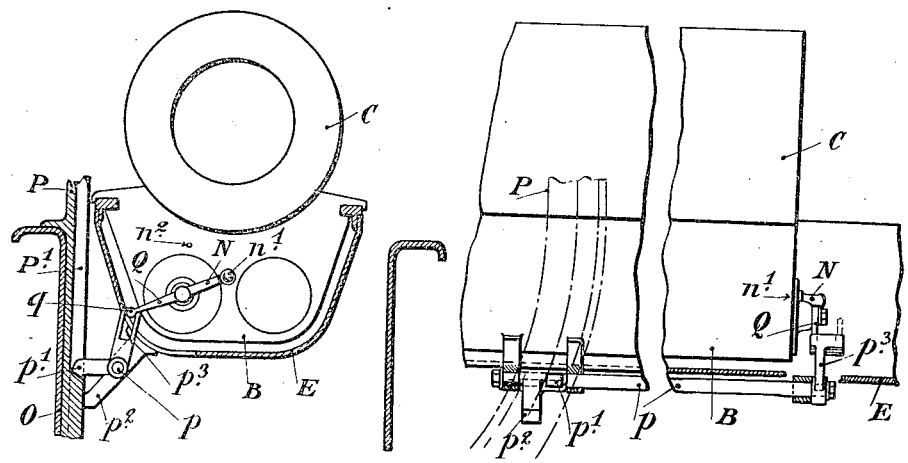
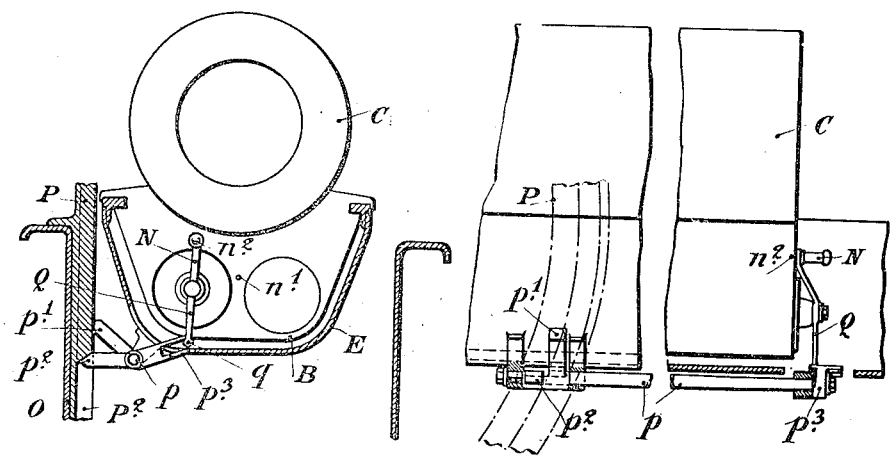

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR VARYING THE RECOIL OF GUNS.

1,335,463.      Specification of Letters Patent.      Patented Mar. 30, 1920.

Application filed June 16, 1919.   Serial No. 304,654.

*To all whom it may concern:*

Be it known that I, EUGÈNE SCHNEIDER, a citizen of the Republic of France, residing at 42 Rue d'Anjou, Paris, France, have invented a new and useful Improved Apparatus for Varying the Recoil of Guns, which is fully set forth in the following specification.

This invention has for its object to provide an improved apparatus adaptable to the hydraulic brakes of guns, designed to allow the movable part of the gun to have at will a normal recoil when firing at low angles of elevation and a short recoil when firing at high angles of elevation.

The improved apparatus is applicable to hydraulic brakes of the known type comprising a cylinder fixed to the recoiling part or to the fixed part and capable of moving along a hollow rod attached at one end to the fixed part or to the recoiling part; the other end of this hollow rod forms a piston and also a braking diaphragm around a shaped counter-rod attached to the opposite end of the cylinder.

The improved apparatus consists essentially of an additional diaphragm which can be coupled at will to the end of the cylinder that carries the counter-rod, or to the part of the piston forming the normal diaphragm, in such a manner that the throttling of the flow of liquid for braking purposes is effected either by means of the normal diaphragm carried by the brake piston, or by means of the additional diaphragm that is then attached to the said piston.

Two constructional forms of this invention are illustrated by way of example in the accompanying drawings in which:

Fig. 1 is a longitudinal section along the axis of the brake cylinder of a gun fitted with the improved apparatus of this invention. The parts are shown arranged for the normal recoil for firing the gun at low angles of elevation. the gun barrel being in its firing position.

Fig. 2 is a corresponding view showing the parts in the positions they occupy at the end of the recoil.

Figs. 3 and 4 are longitudinal sections corresponding respectively to Figs. 1 and 2, the parts being shown arranged for the short recoil for firing at high angles of elevation.

In these figures: A is a hydraulic brake cylinder assumed to be fixed to the recoiling mass (slide B and gun barrel C). In recoiling, the cylinder A slides with its front end $A^1$ along the hollow rod $D^1$ of the brake piston D. This rod is assumed to be attached to a fixed part such as the gun cradle E. The hollow rod $D^1$ surrounds in the usual manner a shaped counter-rod F, the rear end of which is carried by the rear end $A^2$ of the cylinder, while the front end carries the usual valve G of the moderator (apparatus for moderating the return movement of the gun into the firing position). The brake piston D forms in the known manner, a braking diaphragm by means of the port $d$ for effecting a gradual throttling of the flow of the liquid from one side of the piston to the other, that is to say, for throttling the flow from the chamber 1 to the chamber 2; a wire-drawing of the flow being effected between the wall of the said diaphragm and the outer surface of the shaped counter-rod F.

The improved apparatus consists essentially of an additional diaphragm H which normally, that is to say, for the long recoil, is coupled to the end $A^2$ of the brake cylinder, while on the other hand it can be coupled to the piston D when it is desired that the gun barrel shall have a short recoil.

In the example shown in Figs. 1 to 4, the additional diaphragm H consists of a simple sleeve provided at its rear with members I for coupling it to the end $A^2$ of the cylinder, and in front with members J for coupling it to the piston D. The front orifice $h$ of the sleeve H constitutes the additional diaphragm proper, this diaphragm having a shorter diameter than the port $d$.

It is to be understood that normally when the diaphragm H is coupled to the cylinder end $A^2$, the braking will be effected in the usual manner by throttling the flow of liquid between the diaphragm $d$ and the outer surface of the counter-rod F. If, by a suitable means hereinafter described in detail, the diaphragm H be uncoupled from the end $A^2$ and coupled to the piston D, the braking will be effected by throttling the flow of liquid between the port $h$ and the counter-rod F.

A drawback of this simple constructional form of the invention is that it is difficult to give to the counter-rod F a shape that is suitable to produce a braking law adapted both when the parts are set for the long recoil and when they are set for the short recoil. This drawback is obviated in the constructional form illustrated in Figs. 5 to 15. The mechanism which allows of coupling the additional diaphragm alternatively to the rear end of the brake cylinder and to the piston, is the same as that which has been assumed to be applied to the first constructional form, and it is described and illustrated in detail in its application to this second example.

Figure 5:
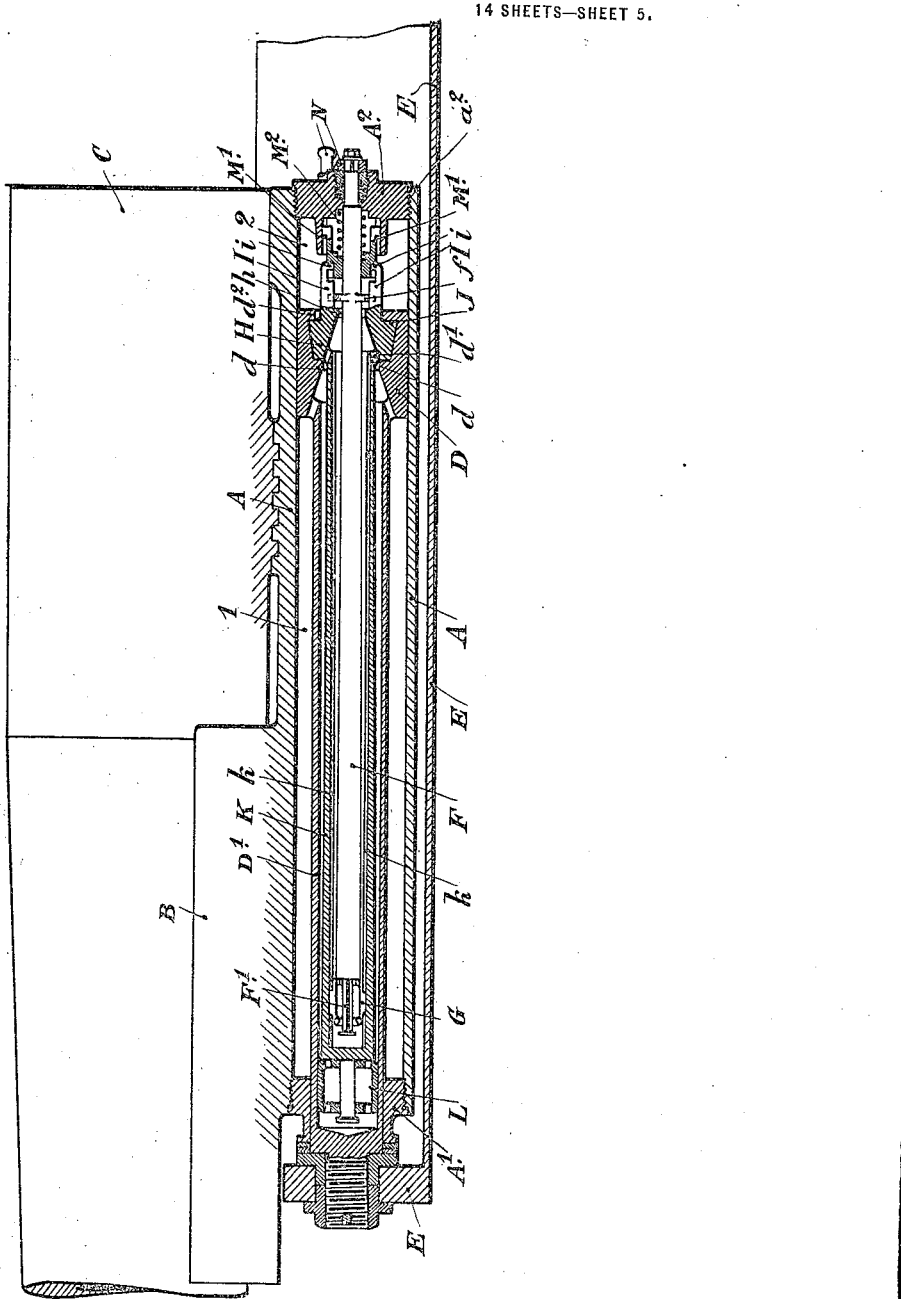
Figure 6:
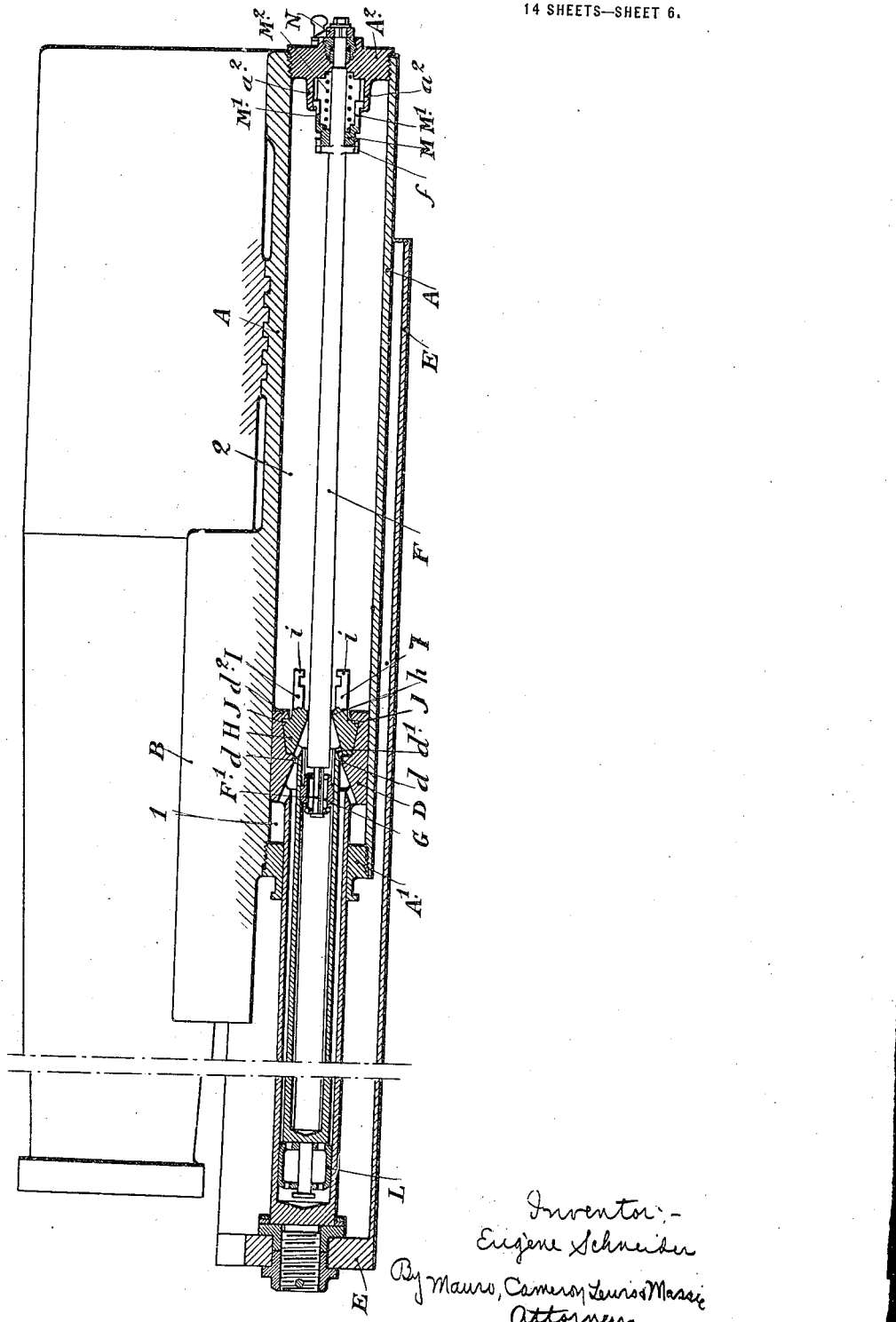
Figure 13:
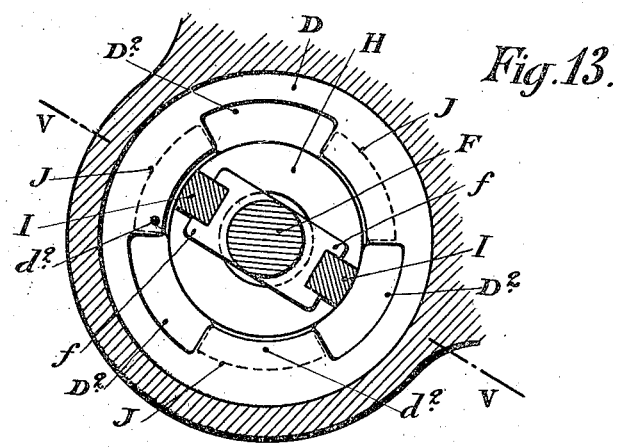
Figure 14:
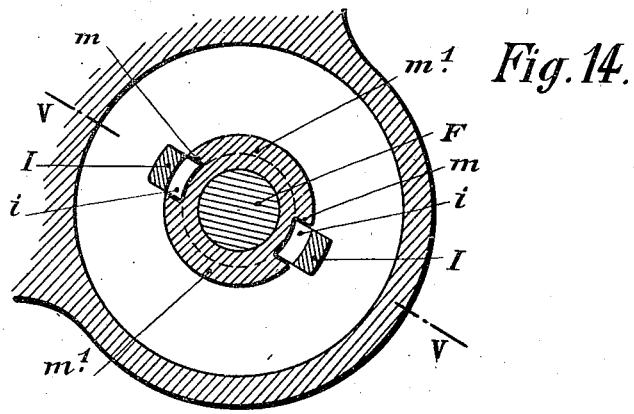

Figs. 5 and 6 are longitudinal sections along the axis of the brake cylinder, but assumed to be taken on the line V—V of the detail Figs. 13 and 14. These figures illustrate the parts respectively in the firing position and at the end of the recoil, the parts being set for the normal recoil, that is to say, for firing at low angles of elevation.

Figure 7:
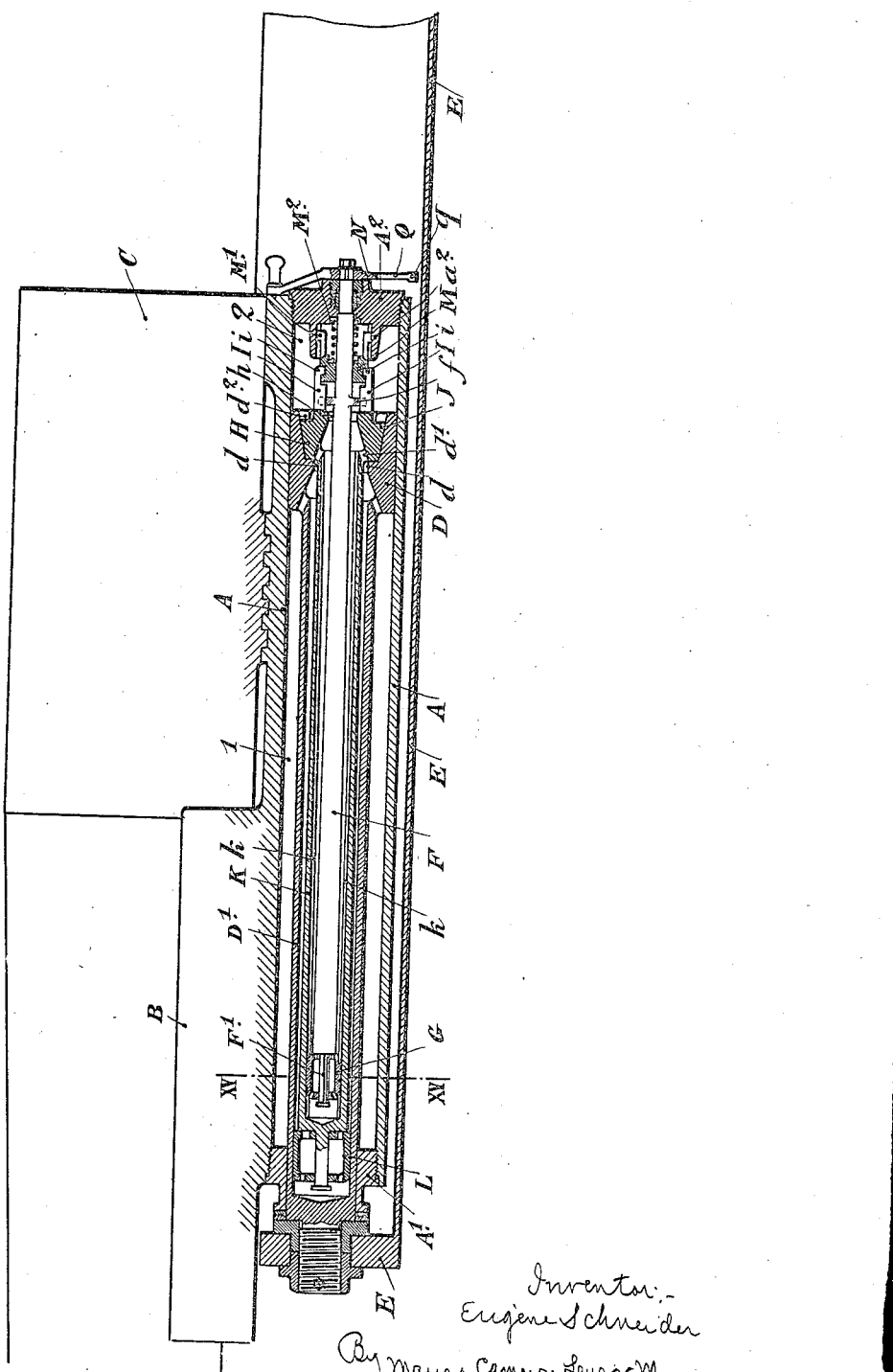
Figure 8:
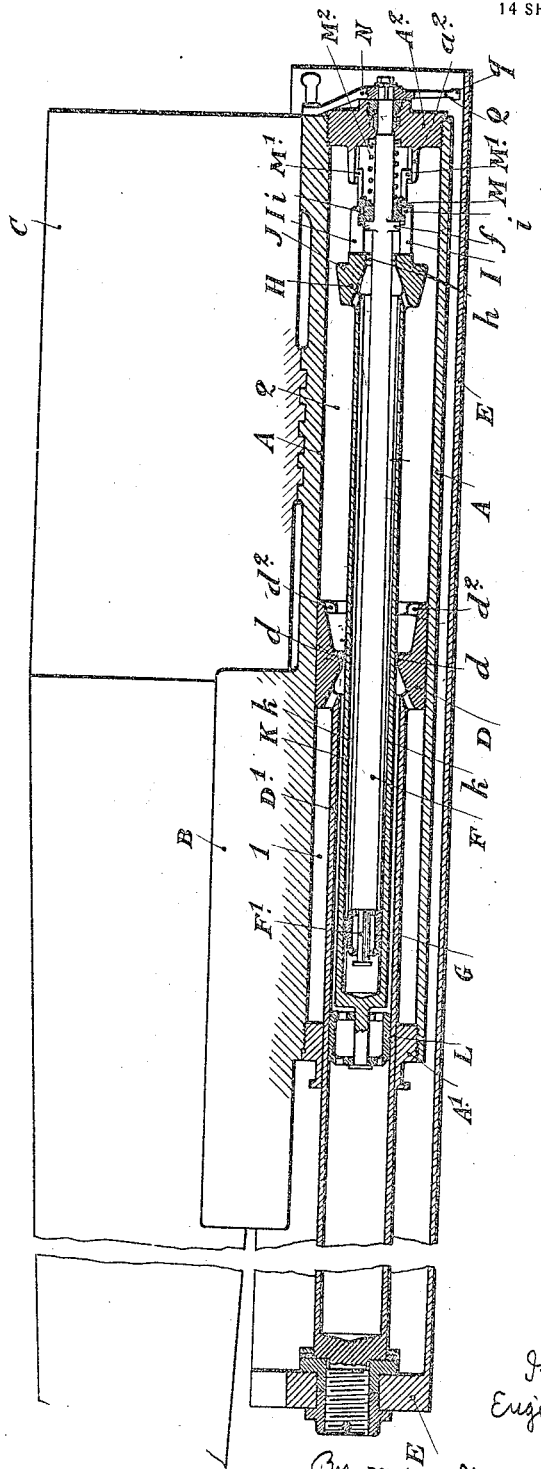
Figure 11:
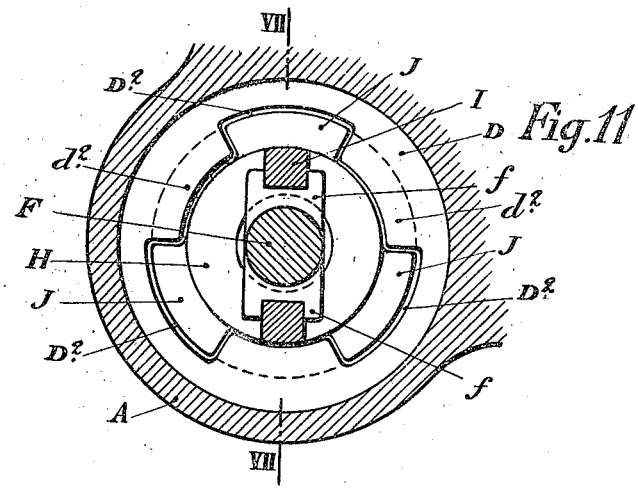
Figure 12:
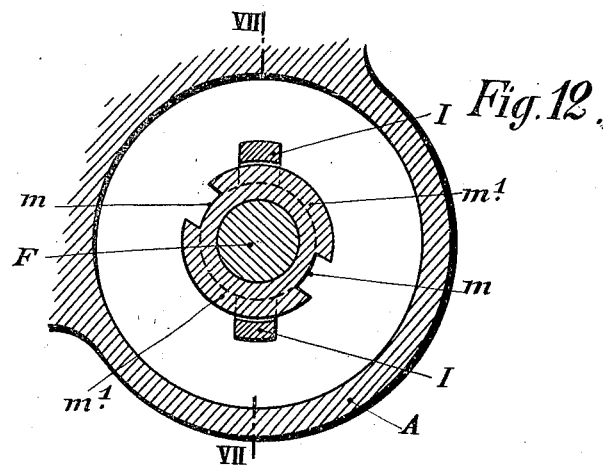

Figs. 7 and 8 are similar sections on the line VII—VII of Figs. 11 and 12, the parts being set for the short recoil and being shown respectively in the position of the gun barrel for firing and at the end of the recoil.

Figure 9:
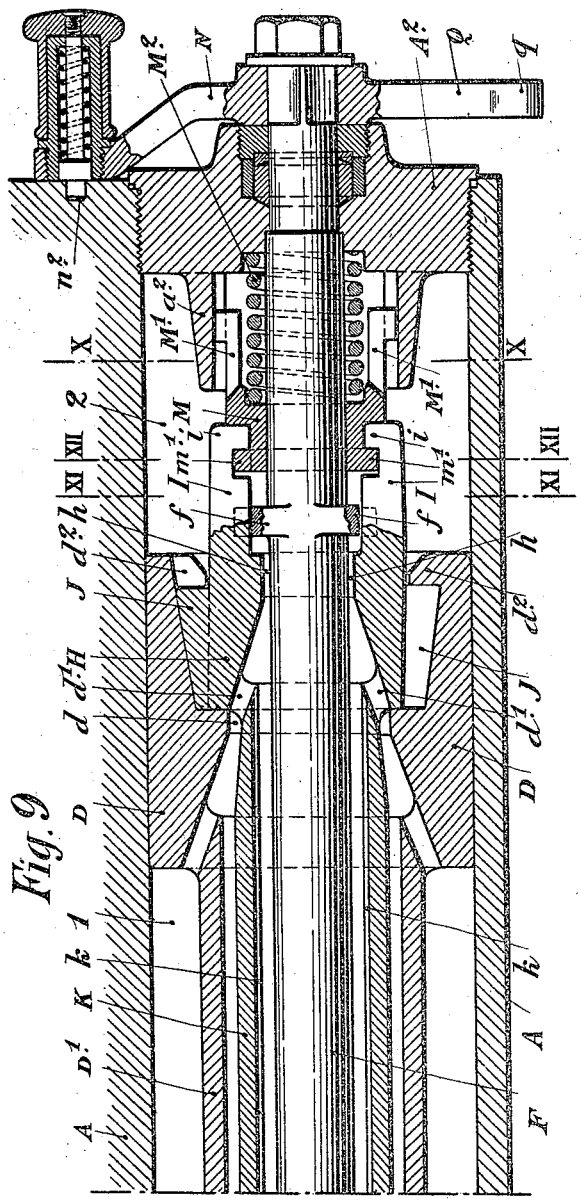

Fig. 9 is a partial longitudinal section drawn to a larger scale, corresponding to Fig. 7.

Figure 10:
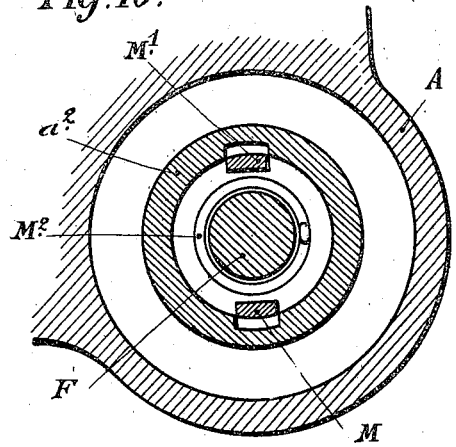

Fig. 10 is a cross section on the line X—X of Fig. 9.

Figs. 11 and 12 are sections respectively on the lines XI—XI and XII—XII of Fig. 9.

Figs. 13 and 14 are sections corresponding respectively to Figs. 11 and 12 but showing the parts moved into the position they occupy when they are set for the normal recoil. Figs. 11 and 12 show the said parts in the positions they occupy for the short recoil.

Figure 15:
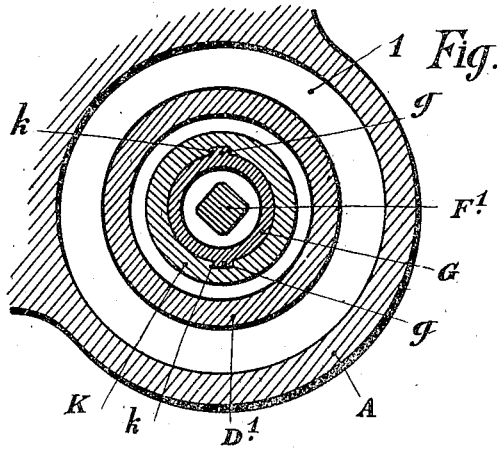

Fig. 15 is a section on the scale of Figs. 11 to 14 on the line XV—XV of Fig. 7.

Figs. 16 to 20 illustrate the connection of the improved apparatus for varying the recoil, with a gun carriage, and they illustrate in detail a safety mechanism for compelling the gun crew to set the parts for the short recoil when the whole of the recoiling mass is elevated beyond a given angle. The same safety mechanism compels the gun crew to set the parts for the normal recoil when the recoiling mass has returned to an elevation less than a given angle.

Fig. 16 is a side elevation of the entire gun.

Fig. 17 is a corresponding partial side elevation drawn to a larger scale.

Fig. 18 is a section on the line XVIII—XVIII of Fig. 16.

In these three Figs. 16, 17 and 18, the parts are shown in the firing position of the gun barrel and set for the normal recoil.

Fig. 19 is a partial elevation similar to Fig. 17, the parts being shown in the firing position of the gun barrel, and set for the short recoil.

Fig. 20 is a section on the line XX—XX of Fig. 16.

In the example shown in Figs. 5 to 9, the additional diaphragm H is fixed to a hollow rod K which in the firing position, surrounds the whole of the usual counter-rod F and the valve G of the moderator. This hollow rod carries at its free end a valve L.

For the normal recoil, that is to say, for firing at low angles of elevation, the whole H—K—L is coupled to the piston D as shown in Figs. 5 and 6. Orifices $d^1$ establish a constant communication between the cavity of the rod K and the chamber $l$ of the brake cylinder. The braking is effected by wire-drawing of the liquid between the side of the port $h$ of the diaphragm H and the counter surface of the counter-rod F.

For firing at high angles of elevation, with the object of obtaining the short recoil, the whole H—K—L is coupled to the rear end $A^2$ of the brake cylinder (Fig. 7.) The rod K is suitably shaped in such a manner as to have a diameter increasing from the rear toward the front end according to a given law. The braking action is produced by the wire-drawing of the liquid between the outside of the rod K and the side of the normal diaphragm $d$ formed by the piston D. It will thus be readily understood that by suitably shaping the counter-rod F, and also suitably shaping the hollow rod K that constitutes the additional counter-rod, it is possible to assure a suitable braking law for both the long recoil and the short recoil.

The apparatus for coupling the additional diaphragm H alternatively to the end $A^2$ of the cylinder and the piston D, in the example of Figs. 1 to 4, or for coupling the whole H—K—L in the example shown in Figs. 6 to 9, is illustrated in detail in Figs. 9 to 15.

Figure 1:
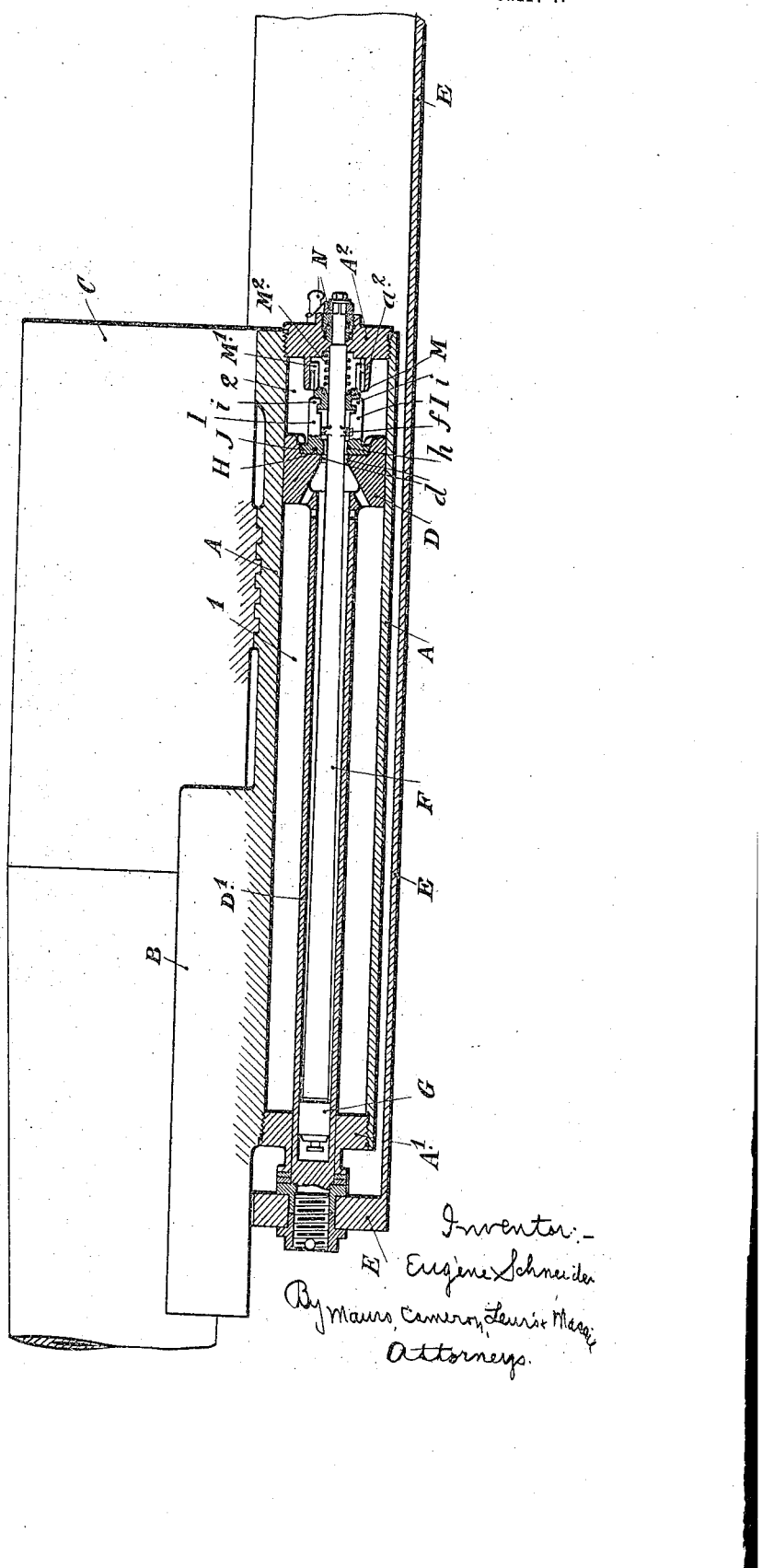
Figures 1 to 4 illustrate one constructional form.
Figure 2:
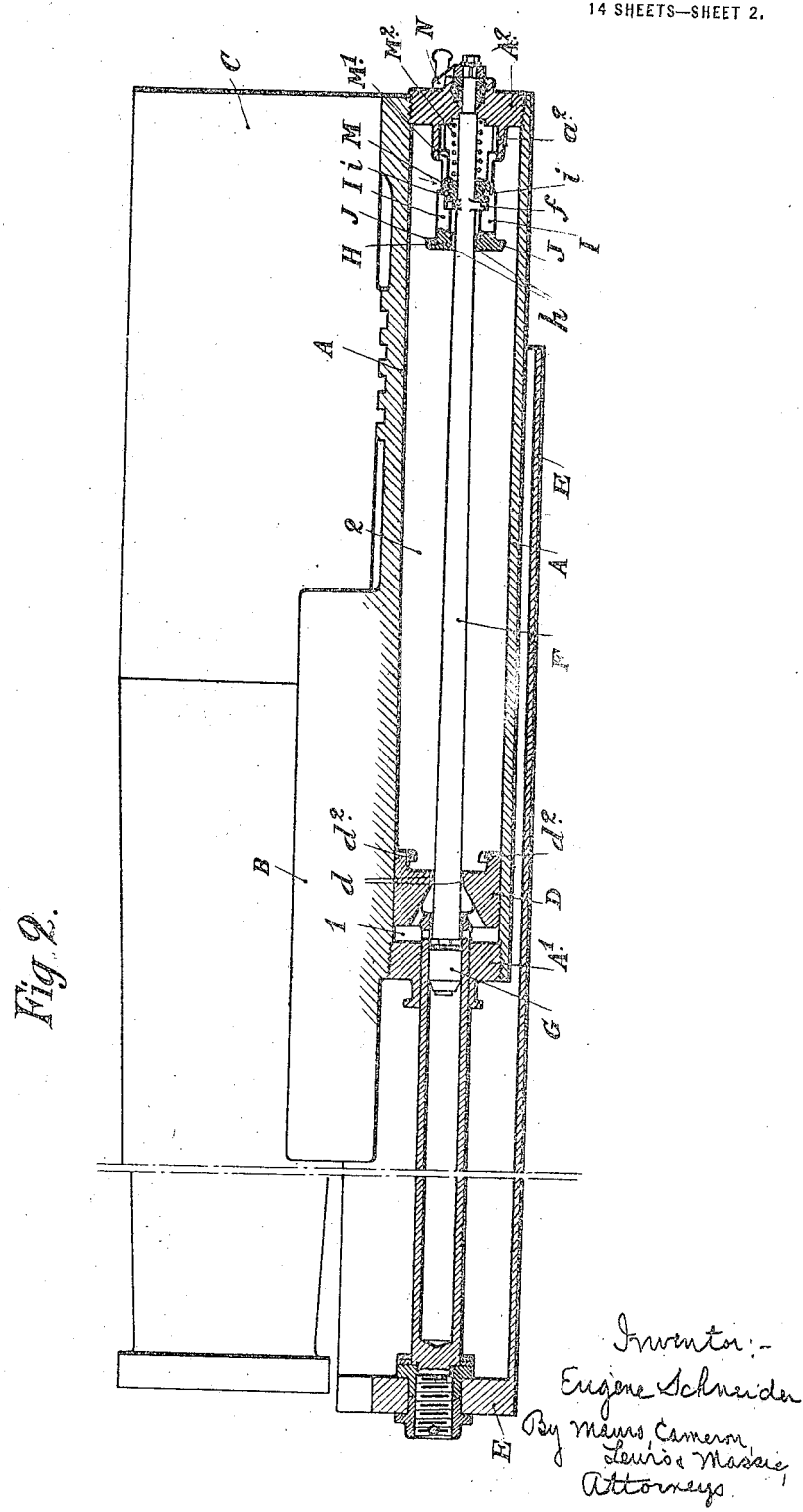
Figure 3:
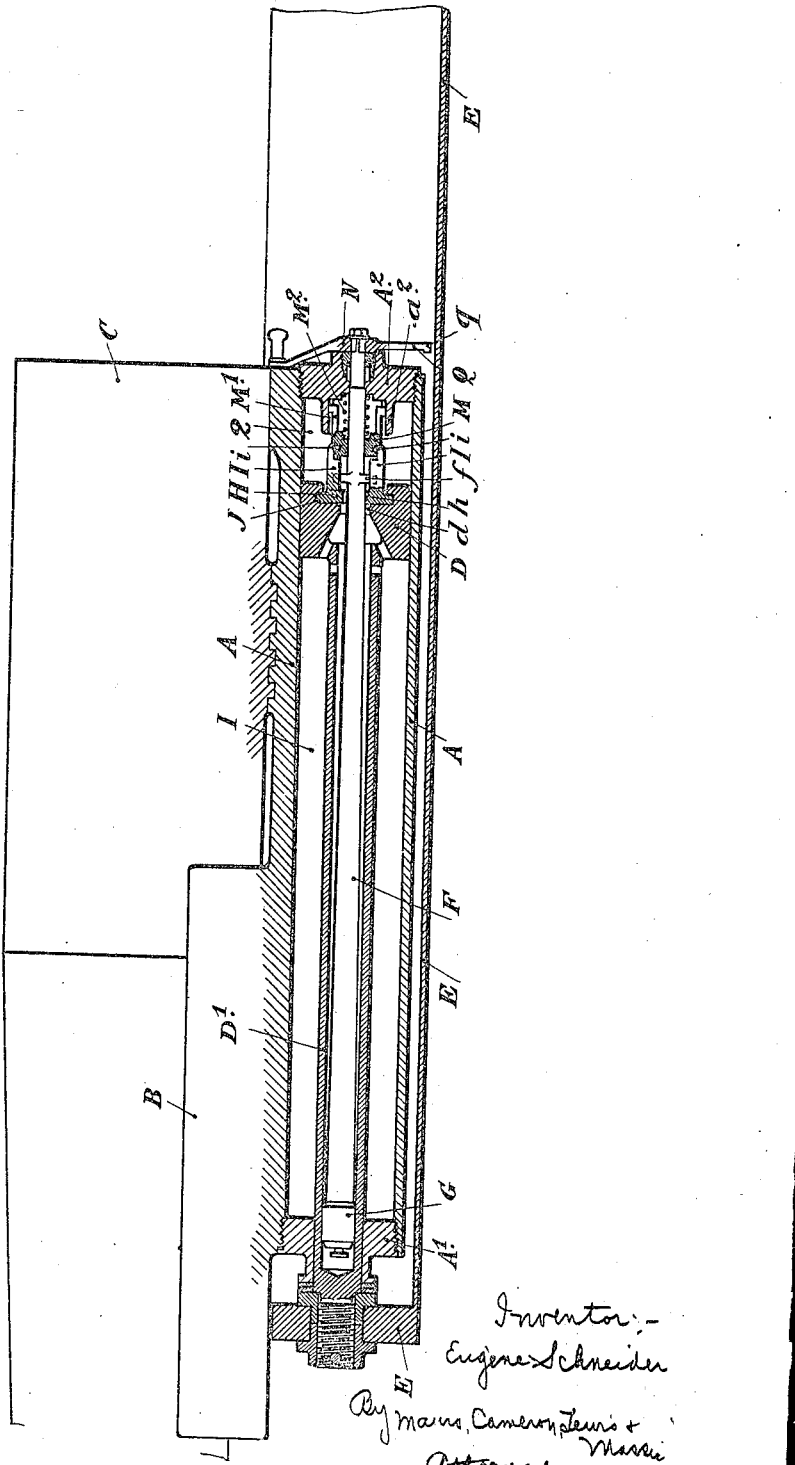
Figure 4:
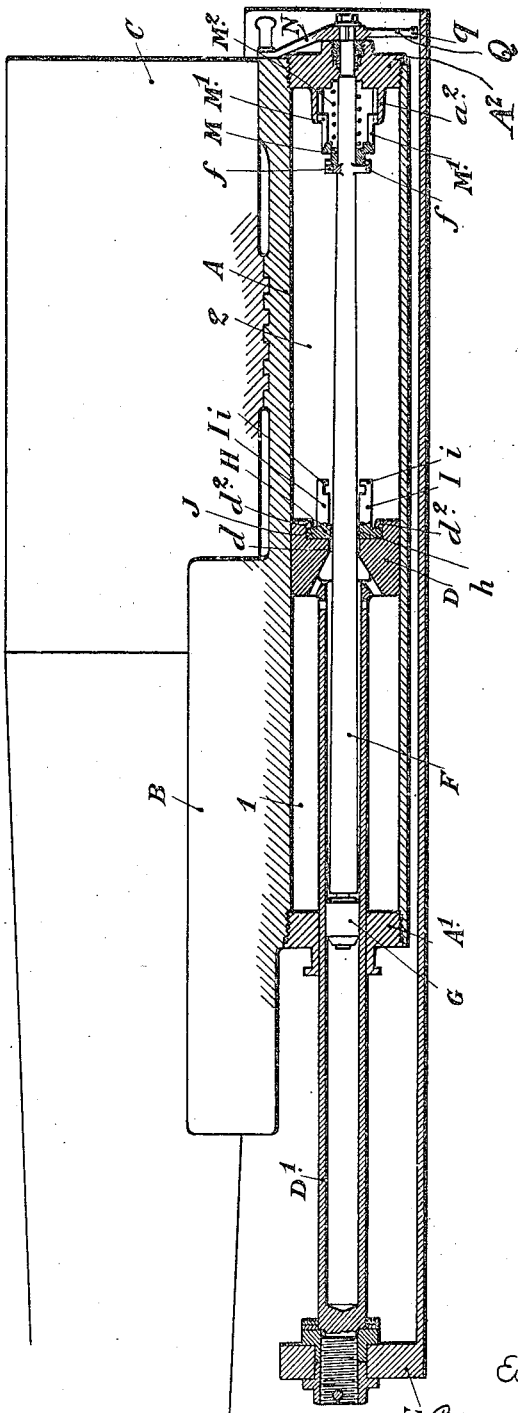

Upon the ordinary counter-rod F there are formed guides $f$ for two rearwardly projecting arms I carried by the additional diaphragm H. A ring M is guided by arms $M^1$ in a socket $a^2$ projecting from the end $A^2$. This ring is formed on its front edge with two notches $m$ (Fig. 12) into which are adapted to engage the noses or hooks $i$ of the arms I in such a manner as to be capable of engaging behind the solid portions $m^1$ for coupling the diaphragm H to the ring M. This ring which is under the action of a spring $M^2$, is able to perform only limited movements in the socket $a^2$, because it is adapted to strike with its solid portions $m^1$ against the guides $f$ formed on the counter-rod F (Figs. 2 and 8).

$D^2$ are notches formed in a collar provided on the rear face of the piston D in such a manner as to form corresponding solid portions or "lands" $d^2$ between the said notches. J are ribs projecting from the outer wall of the diaphragm H; they correspond in width to the notches $D^2$ for coupling the diaphragm H to the piston D. The ribs J engaged in the notches $D^2$ are then shifted angularly in such a manner as to engage behind the lands $d^2$.

The rotational motion of the diaphragm H is produced by moving the latter by means of the guides $f$ of the counter-rod F, which latter can be actuated from the outside by means of a crank handle N.

Assuming the parts to be in the positions shown in Figs. 9, 11 and 12, where the diaphragm H is coupled by the engagement of the noses $i$ behind the lands $m^1$ of the ring M, it will be possible from this position, to effect the uncoupling of the diaphragm H from the ring M and to couple the said diaphragm to the piston D. As a matter of fact it is sufficient to rotate by means of the crank N, the counter-rod F through an angle of 60° in the desired direction. The ribs J which were situated in front of the notches $D^2$, are thereby brought behind the lands $d^2$ of the collar formed on the rear face of the piston D (Fig. 13). At the same time the noses $i$ of the arms I which were engaged behind the lands $m^1$ of the ring M (Fig. 12) are brought opposite the notches $m$ of the said ring, as shown in Fig. 14. In other words, the diaphragm H is by this means coupled to the piston D, while it is free to move out of engagement of the movable ring M of the end $A^2$ of the cylinder. The crank N may be locked in one or the other of the positions corresponding to the coupling of the diaphragm H to the end $A^2$ of the cylinder, or to its coupling to the piston D. The handle of the said crank is formed for this purpose as a spring bolt, and the nose of this bolt is adapted to engage into one or other of two sockets $n^1$, $n^2$ formed in the gun slide (Figs. 9 and 17 to 20).

In the example shown in Figs. 5 to 8, a device is provided for preventing any untimely rotation of the whole H—K—L when the latter is coupled to the piston D. For this purpose the valve G (Figs. 7 and 15) mounted on a rod $F^1$ of square section, is formed externally with two ribs $g$ that are guided in grooves $h$ cut in the hollow rod K.

The spring $M^2$ against which the ring M bears, has a constant tendency to push this ring toward the guides $f$ in such a manner as to assure to the parts, when returned into the firing position of the gun, a suitable relative location for coupling or uncoupling the auxiliary diaphragm H.

Figs. 16 to 20 illustrate as hereinbefore stated, a safety mechanism for preventing the parts of the brake being set for the short recoil so long as the gun has not reached a determined angle of elevation, and inversely, for preventing the setting of these other parts for the normal recoil so long as the gun barrel has an elevation higher than the said angle.

P is a circular guide arc fixed on one of the gun carriage frame plates O. In this arc are formed two arc-shaped grooves $P^1$ and $P^2$ having their center in the axis of the gun cradle trunnions. Two fingers $p^1$, $p^2$ are adapted to engage respectively in these grooves. These fingers are fixed on a shaft $p$ journaled in bearings carried by the gun cradle. The fixed position of the fingers $p^1$, $p^2$ and the arrangement of the grooves $P^1$ and $P^2$ are such that the finger $p^1$ reaches the lower end of the groove $P^1$ when the finger $p^2$ is situated opposite the upper end of the groove $P^2$. On the other hand the shaft $p$ has fixed on it a forked lever $p^3$ the fork of which is adapted to receive the end $q$ of an extension Q of the crank N.

So long as the gun barrel has a low angle of elevation, the finger $p^1$ is engaged in the groove $p^1$, while the finger $p^2$ slides over a solid portion of the guide arc P.

When the gun barrel has reached the angle of elevation selected for changing from the normal recoil over to a short recoil, the finger $p^1$ will strike the lower end of the groove $P^1$ (Figs. 17 and 18). So long as this elevation has not been reached it is impossible to operate the crank N for changing from the position of normal recoil over to the position of short recoil. As a matter of fact the passing of the crank into this position requires a counter-clockwise rotational motion which is impossible owing to the finger $p^2$ abutting against a solid portion of the guide arc P.

This rotational motion is on the contrary possible when the finger $p^2$ comes opposite the groove $P^2$ (Figs. 19 and 20). It will be seen that for all elevations of the gun barrel that are higher than the elevation indicated in dot and dash lines in Fig. 16, the finger $p^2$ will be situated in the groove $P^2$, whereas the finger $p^1$ abuts against a solid portion of the guide arc P and thereby prevents the crank N from rotating in a clockwise direction, thus rendering it impossible to change to the normal recoil.

What I claim is:

1. In brake apparatus for guns, a brake cylinder, a piston therein having a brake diaphragm, a second diaphragm member movable in respect to said piston, means for throttling fluid passing from one side of said piston to the other through said diaphragms, and means for coupling said movable diaphragm to one of said brake elements for long recoil and to another brake element for short recoil.

2. In brake apparatus for guns, the combination of a brake cylinder having a counter-rod, a piston in said brake cylinder having a diaphragm, a second diaphragm member in throttling relation to said counter-rod and movable in respect to said piston, and having a tubular counter-rod adapted to throttle fluid passing through said first-named diaphragm, means for locking said movable diaphragm to either said piston or to said brake cylinder for rendering operative one or the other of said throttling members to effect throttling of fluid through one or the other of said diaphragms.

3. In brake apparatus for guns, the combination of a brake cylinder having a counter-rod movable with a recoiling part of the gun, a piston in said cylinder having a diaphragm, a second diaphragm movable in respect to said piston in throttling relation with said counter-rod and having a tubular counter-rod adapted to throttle fluid passing through said first-named diaphragm, means for coupling said second-named diaphragm to said piston for short recoil and to said brake cylinder for long recoil, and safety means operated by the angular displacement of the gun for controlling the operation of said coupling means.

4. In brake apparatus for guns, the combination of a brake cylinder having a revoluble counter-rod, a piston in said brake cylinder having a diaphragm, a second diaphragm movable in respect to said piston and in throttling relation to said counter-rod and having a tubular counter-rod adapted to throttle fluid passing through said first-named diaphragm, and means operated by said first-named counter-rod for locking said movable diaphragm to one of said brake elements for long recoil and to another brake element for short recoil.

5. In brake apparatus for guns, a brake cylinder having a revoluble counter-rod, a piston in said cylinder having a diaphragm, a revoluble diaphragm in throttling relation to said counter-rod and having a tubular counter-rod adapted to throttle fluid passing said diaphragm, connections between said first-named counter-rod and said second-named diaphragm for rotating the latter, and means on said piston and other means on said brake cylinder adapted to be alternately engaged by parts of said second diaphragm for locking the same to said piston for long recoil and to said brake cylinder for short recoil.

6. In brake apparatus for guns, the combination of a brake cylinder having a valved counter-rod movable with a recoiling part of the gun, a piston in said cylinder having a diaphragm, a second diaphragm movable in respect to said piston and in throttling relation to said counter-rod and having a tubular counter-rod surrounding the forward portion of said first-named rod, and means for locking said second-named diaphragm to said piston for short recoil and to said cylinder for long recoil.

7. In brake apparatus for guns, the combination of a brake cylinder movable with a recoiling part of the gun and having a revoluble counter-rod provided with a valve, a brake piston in said cylinder having a diaphragm and provided with a piston cylinder fast to a fixed part of the gun, a second diaphragm member in throttling relation to said counter-rod and movable in respect to said piston and having a tubular counter-rod for receiving said valved counter-rod and adapted to throttle fluid passing through said piston diaphragm, means for coupling said second diaphragm member to said piston for short recoil and to said brake cylinder for long recoil, and splined connections between said counter-rod members for preventing untimely rotation of one member in respect to the other.

8. In brake apparatus for guns, a brake cylinder having a revoluble counter-rod, a piston in said cylinder having a stationary diaphragm, a revoluble diaphragm in throttling relation to said counter-rod and having a tubular counter-rod adapted to throttle fluid passing through said first-named diaphragm, locking elements on said piston and on said brake cylinder, and means operating through the rotation of said first-named counter-rod for moving said second-named diaphragm in and out of locking engagement with said elements.

9. In brake apparatus as claimed in claim 7, the combination with said revoluble diaphragm, of coupling elements on said diaphragm, a spring-pressed collar slidable on said first-named counter-rod adapted to receive said coupling elements, and means on said rod having slidable engagement with said coupling elements for rotating the diaphragm into and out of locking engagement with said spring-pressed member.

10. In brake apparatus for guns, a brake cylinder, a piston therein having a brake diaphragm, a second diaphragm member movable in respect to said piston, means for throttling fluid passing from one side of said piston to the other through said diaphragms, means for coupling said movable diaphragm to one of said brake elements for long recoil and to another brake element for short recoil, and safety means operated by the angular displacement of the gun for controlling the operation of said coupling means.

In testimony whereof I have signed this specification.

EUGÈNE SCHNEIDER.

Witnesses:
ANDRÉ MOSTICKER,
CHAS. P. PRESSLY.